US011381161B2

(12) United States Patent
Lai et al.

(10) Patent No.: US 11,381,161 B2
(45) Date of Patent: Jul. 5, 2022

(54) CONTROLLING A SWITCHING ORDER OF POWER SWITCHES FOR MITIGATING VOLTAGE OVERSTRESS (71) Applicant: NXP B.V., Eindhoven (NL)

(72) Inventors: Suming Lai, San Diego, CA (US);
Kenneth Chung Yin Kwok, Irvine, CA (US); Fuchun Zhan, Shanghai (CN)

(73) Assignee: NXP B.V., Eindhoven (NL)

( * ) Notice: Subject to any disclaimer, the term of this patent is extended or adjusted under 35 U.S.C. 154(b) by 288 days.

(21) Appl. No.: 16/851,071

(22) Filed: Apr. 16, 2020

(65) Prior Publication Data

US 2021/0257907 A1 Aug. 19, 2021

(30) Foreign Application Priority Data

Feb. 18, 2020 (CN) .................. 202010100659.X (51) Int. Cl.
| H02M 3/07 | (2006.01) |
| H02M 1/08 | (2006.01) |
| H02M 1/38 | (2007.01) |
| H02J 7/00 | (2006.01) |
| H02J 50/10 | (2016.01) |
| H02J 7/02 | (2016.01) |

(52) U.S. Cl.
CPC .............. *H02M 3/07* (2013.01); *H02J 7/007* (2013.01); *H02M 1/08* (2013.01); *H02M 1/38* (2013.01); *H02J 7/02* (2013.01); *H02J 50/10* (2016.02); *H02J 2207/20* (2020.01)

(58) Field of Classification Search
CPC .... H02M 3/07; H02M 1/08; H02J 7/00; H02J 50/10; H02J 2207/20

USPC ......................................... 320/140
See application file for complete search history.

(56) References Cited

U.S. PATENT DOCUMENTS

| 10,530,256 B1* | 1/2020 | Jayaraman .......... H02M 3/1584 |
| 2002/0030534 A1 | 3/2002 | Myono |
| 2010/0246076 A1* | 9/2010 | Campi, Jr ............... G06F 30/30 |
| | | 716/136 |

FOREIGN PATENT DOCUMENTS

| CN | 104052278 B | 10/2018 | |
| EP | 3 429 073 A1 | 1/2019 | |
| JP | 1718389 B2 | 7/2011 | |
| WO | WO-2016079039 A1 * | 5/2016 | .......... H02M 1/0095 |
| WO | WO-2016149211 A1 * | 9/2016 | .......... H01L 27/0259 |

OTHER PUBLICATIONS

Dao, D. et al. "Zero-Current-Switching Multilevel Modular Switched-Capacitor DC-DC Converter", IEEE Transactions on Industry Applications, vol. 46, No. 6, pp. 2536-2544 (Nov. 2010).

* cited by examiner

*Primary Examiner* — Richard Isla
*Assistant Examiner* — Dung V Bui (57) ABSTRACT

An example method includes controlling a switching order of a plurality of power switches. The power switches are coupled to a flying capacitor and include parasitic bipolar transistors susceptible to the voltage overstress in response to excess stray inductance of the flying capacitor. The method further includes, in response to the controlled switching order, converting an input voltage of a first voltage level to an output voltage of a second voltage level while mitigating the voltage overstress of the parasitic bipolar transistors of the plurality of power switches.

20 Claims, 9 Drawing Sheets

CONTROLLING A SWITCHING ORDER OF POWER SWITCHES FOR MITIGATING VOLTAGE OVERSTRESS

OVERVIEW

Aspects of various embodiments are directed to apparatuses and methods of controlling a switching order of power switches for mitigating voltage overstress.

Power converters may be used for a variety of purposes, such as high-voltage battery charging for mobile devices. A power converter may convert an input power at a first voltage level to an output power at a second voltage level. The second voltage level may include a higher level than the first voltage level, sometimes referred to as "up-conversion", or may include a lower level than the first voltage level, sometimes referred to as "down-conversion".

These and other matters have presented challenges to efficiencies of power switch implementations, for a variety of applications.

SUMMARY

Various example embodiments are directed to issues such as those addressed above and/or others which may become apparent from the following disclosure concerning converting an input voltage by controlling a switching order of power switches of a power converter while mitigating voltage stress of components of the power converter.

In certain example embodiments, aspects of the present disclosure involve controlling a switching order of the power switches, which include parasitic bipolar transistors susceptible to voltage overstress in response to excess stray inductance of a coupled flying capacitor, while mitigating the voltage overstress.

In a more specific example embodiment, a method includes controlling a switching order of a plurality of power switches. The plurality of power switches are coupled to a flying capacitor and include parasitic bipolar transistors susceptible to the voltage overstress in response to excess stray inductance of the flying capacitor. The method further includes, in response to the controlled switching order, converting an input voltage of a first voltage level to an output voltage of a second voltage level while mitigating the voltage overstress of the parasitic bipolar transistors of the plurality of power switches.

The switching order may be controlled by transitioning a first power switch and a second power switch of adjacent pairs of the plurality of power switches between an on-state and an off-state at different times. For example, the plurality of power switches include at least two pairs of adjacent power switches. Controlling the switching order may include, for each pair of adjacent power switches, transitioning a first of the respective pair of the adjacent power switches from an on-state to an off-state at a first time, and transitioning a second of the respective pair of the adjacent power switches from the on-state to the off-state at a second time which is delayed from the first time. Transitioning the second of the respective pair of adjacent power switches at the second time may mitigate or prevent one of the parasitic bipolar transistors of the pair of adjacent power switches from transitioning back to the on-state in response to the excess stray inductance of the flying capacitor when the plurality of power switches are in the off-state (e.g., dead time).

In some specific embodiments, the flying capacitor is further susceptible to voltage overstress. In such embodiments, controlling the switching order of the plurality of power switches includes transitioning a first power switch and a second power switch of pairs of adjacent power switches of the plurality between an on-state and an off-state at different times while mitigating the voltage overstress of the flying capacitor and the parasitic bipolar transistors of the plurality of power switches. Transitioning the second of the respective pair of the adjacent power switches at the second time may minimize a peak voltage ringing across the flying capacitor caused by the excess stray inductance when the plurality of power switches are in the off-state. For example, the flying capacitor may be susceptible to voltage overstress when a maximum voltage rating of the flying capacitor is near an application voltage.

In more specific and related embodiments, the plurality of power switches include a first pair and a second pair of adjacent power switches. Controlling the switching order of the plurality of power switches may include: transitioning the first pair of adjacent power switches to an on-state while the second pair of adjacent power switches are in an off-state, transitioning a first power switch of the first pair to the off-state at a first time such that a second power switch of the first pair remains in the on-state while the first power switch of the first pair and the second pair of adjacent power switches are in the off-state, and transitioning the second power switch of the first pair to the off-state at a second time that is delayed from the first time such that each of the plurality of power switches are in the off-state. The plurality of power switches may form part of a switched-capacitor direct current (DC)-DC converter (SCC), and the first time is associated with a blank time of the SCC and the second time is associated with a dead time of the SCC.

Controlling the switching order may further include: transitioning the second pair of adjacent power switches to the on-state while the first pair of adjacent power switches remain in the off-state, transitioning a first power switch of the second pair to the off-state at a third time such that the second power switch of the second pair remains in the on-state while the first power switch of the second pair and the first pair of adjacent power switches are in the off-state, and transitioning the second power switch of the second pair to the off-state at a fourth time that is delayed from the third time such that each of the plurality of power switches are in the off-state. The first time and the third time are associated with a blank time of the SCC and the second time and the fourth time are associated with a dead time of the SCC.

In a number of embodiments, the flying capacitor has the excess stray inductance, and the plurality of power switches include pairs of adjacent power switches. The method may further include the stray inductance (e.g., a stray inductor) storing energy when a first pair of adjacent power switches of the plurality of power switches are in an on-state, and draining the stored energy in response to one power switch of the first pair transitioning to an off-state while the other power switch of the first pair remains in the on-state.

In another specific embodiment, an example apparatus includes a flying capacitor, a plurality of power switches, and a gate control circuit. The flying capacitor may be susceptible to voltage overstress. The plurality of power switches are coupled to the flying capacitor and convert an input voltage of a first voltage level to an output voltage of a second voltage level. The plurality of power switches have parasitic bipolar transistors susceptible to voltage overstress in response to excess stray inductance of the flying capacitor. The gate controller circuit controls a switching order of the plurality of power switches to convert the input voltage to the second voltage level while mitigating the voltage overstress of the flying capacitor and the parasitic bipolar transistors of the plurality of power switches.

In other specific example embodiments, the flying capacitor, the plurality of power switches and the gate controller circuit form part of a SCC. The SCC may convert the input voltage of the first voltage level from a first power source to the second voltage level via one or more of an up-conversion mode and a down-conversion mode, and may provide the output voltage at the second voltage level to a load circuit. In more specific embodiments, the apparatus comprises a battery charging system which includes the switched-capacitor DC-DC converter.

The gate control circuit controlling the switching order may include transitioning a first power switch and a second power switch of pairs of adjacent power switches of the plurality of power switches from on-state to an off-state at different times. The plurality of power switches may include a first pair and a second pair of adjacent power switches. The gate controller circuit is to control the switching order by providing control signals to gates of the plurality of power switches to selectively turn the plurality of power switches on and off during a switching cycle. A switching cycle may include at least one blank time in which at least one power switch of the plurality of power switches is in an on-state and the remaining plurality of power switches are in an off-state, and at least one dead time in which the plurality of power switches are in the off-state. The at least one dead time may sequentially follow the at least one blank time. In various embodiments, the at least one blank time is associated with one power switch of the plurality of power switches being in the on-state and the remaining plurality of power switches being in the off-state.

The flying capacitor may have or be associated with excess stray inductance. The excess stray inductance is to store energy when a pair of adjacent power switches are in an on-state and is to drain the stored energy in response to one power switch of the pair of adjacent power switches transitioning to an off-state while the other power switch of the pair of power switches remains in the on-state. For example, the gate control circuit may delay the transition to the off-state of a second power switch (of a pair of adjacent power switches) from the transition of a first power switch (of the pair) to the off-state and, in response, to drain energy stored on the stray inductance.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems, and methods involving controlling a switching order of power switches while converting power using a power converter. In certain implementations, aspects of the present disclosure have been shown to be beneficial when used in the context of mitigating voltage overstress of components of the power converter by delaying transitions between on and off-states of a power switch among a pair of adjacent power switches. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Power converters, such as switched-capacitor direct current (DC)-DC converters (SCC) may be used to convert an input power to a different voltage level. As a specific example, in an application directed to a high-voltage charging application, a SCC may convert an input DC voltage from a power source, such as an external power source, to a battery voltage which is used to deliver power into the battery. In a mobile phone or other mobile device application, an output voltage from a wireless power receiver may be down-converted for providing power into the battery of the mobile phone. Conversely, battery voltage from the battery may be up converted to provide a DC voltage output that is greater than the battery voltage. As an example, the mobile phone or other mobile device may transmit power through inductively coupled coils to an external device. As further described herein, the power converter may include a plurality of power switches and a flying capacitor used to convert the input voltage from a first voltage level to a second voltage level. In many applications, the size of the power converter is miniaturized and the power converters may be integrated in a chip with exception of the flying capacitor(s) (and as further described herein and in some examples, the boot strap capacitor(s)). The on-chip power switches and off-chip flying capacitor(s) may be vulnerable to voltage stress due to the size of the components and the application voltage. As a particular example, the power switches include parasitic bipolar transistors that are prone to turn on when excess stray inductance of the flying capacitor is present, and which may dissipate high transient power and generate excessive heat source that degrades the power switch and the surrounding circuits integrated together. The voltage rating of the flying capacitor may be limited by the respective circuit size. Due to miniaturization, the maximum operating voltage of the flying capacitor is pushed closer to the application voltage, resulting in vulnerability to voltage overstress. Embodiments in accordance with the present disclosure include a controlled switching order of a plurality of power switches of a power converter which mitigates the voltage overstress of the parasitic bipolar transistors of the power switches and/or the flying capacitor.

In various specific embodiments, the power converter includes pairs of adjacent power switches (e.g., two pairs of adjacent power switches). The transition from an on-state to off-state for the power switches is controlled to mitigate and/or avoid high current enforced by the stray inductor of the flying capacitor(s) into the parasitic bipolar transistors in either adjacent power switch during a dead time in which all power switches are in an off-state. For example, during the dead time, every two adjacently connected power switches are both in off-state. If there is current being forced, by stray inductors for example, into the power switch, a parasitic bipolar transistor may turn on. By delaying the transition to the off-state of one of the power switches of the adjacent pair (which is turned on), energy from the stray inductor is drained which may mitigate unintentional turning on of the parasitic bipolar transistor and may also minimize the peak voltage ringing across the flying capacitor(s) caused by the stray inductor during a dead time. This period of time, which is further described herein, is sometimes referred to as a "blank time". A blank time includes a period of time in a switching cycle in which one power switch of a pair of adjacent power switches is in an on-state and the other power switch of the pair of adjacent power switches is in an off-state. The blank time may be generated by delaying a transition of one power switch of the pair of adjacent power switches from an on-state to an off-state.

In a specific embodiment, a method for controlling a switching order of power switches of a power converter is used to mitigate voltage overstress of components of the power converter while converting power from a first voltage level to a second voltage level. The method includes controlling a switching order of the plurality of power switches, the power switches being coupled to a flying capacitor and the power switches including parasitic bipolar transistors susceptible to the voltage overstress in response to excess stray inductance of the flying capacitor. In response to the controlled switching order, the method further include converting an input voltage of a first voltage level to an output voltage of a second voltage level while mitigating the voltage overstress of the parasitic bipolar transistors of the plurality of power switches. In some embodiments, the flying capacitor is further susceptible to voltage overstress.

Controlling the switching order of the plurality of power switches may include transitioning a first power switch and a second power switch of adjacent pairs of the plurality of power switches between an on-state and an off-state at different times while mitigating the voltage overstress of the flying capacitor and/or the parasitic bipolar transistors of the plurality of power switches. For example, the plurality of power switches include two pairs of adjacent power switches. Controlling the switching order may include, for each pair of adjacent power switches: transitioning a first power switch of the respective pair of adjacent power switches from an on-state to an off-state at a first time, and transitioning a second power switch of the respective pair of adjacent power switches from the on-state to the off-state at a second time which is delayed from the first time. Transitioning the second power switch at the second time mitigates or prevents a parasitic bipolar transistor of the pair of power switches from transitioning back to the on-state in response to the excess stray inductance of the flying capacitor. Alternatively and/or in addition, transitioning the second power switch at the second time minimizes a peak voltage ringing across the flying capacitor caused by the excess stray inductance when the plurality of power switches are in the off-state.

In various related and specific embodiments, the plurality of power switches include a first pair and a second pair of adjacent power switches. The plurality of power switches may form part of a SCC. Controlling the switching order of the plurality of power switches may include transitioning the first pair of adjacent power switches to an on-state while the second pair of the adjacent power switches are in an off-state, transitioning a first power switch of the first pair to the off-state at a first time such that a second power switch of the first pair remains in the on-state while the first power switch of the first pair and the second pair of adjacent power switches are in the off-state, and transitioning the second power switch of the first pair to the off-state at a second time that is delayed from the first time such that each of the plurality of power switches are in the off-state. Controlling the switching order further including transitioning the second pair of adjacent power switches to the on-state while the first pair of the adjacent power switches remain in the off-state, transitioning a first power switch of the second pair to the off-state at a third time such that the second power switch of the second pair remains in the on-state while the first power switch of the second pair and the first pair of adjacent power switches are in the off-state, and transitioning the second power switch of the second pair to the off-state at a fourth time that is delayed from the third time such that each of the plurality of power switches are in the off-state. As further described herein, the first time and/or the third time are associated with a blank time of the SCC, and the second time and/or the fourth time are associated with a dead time of the SCC.

In various embodiments, the flying capacitor has an excessive stray inductance, and the plurality of power switches include pairs of adjacent power switches. The method further includes, via the excessive stray inductance of the flying capacitor, storing energy when a first pair of adjacent power switches of the plurality are in an on-state, and draining the stored energy in response to one power switch of the first pair transitioning to an off-state while the other power switch of the first pair remains in the on-state.

Other example embodiments are directed to apparatuses which include the above-described power switches, flying capacitor, and a gate controller circuit to control a switching order of the power switches.

Figure 1:
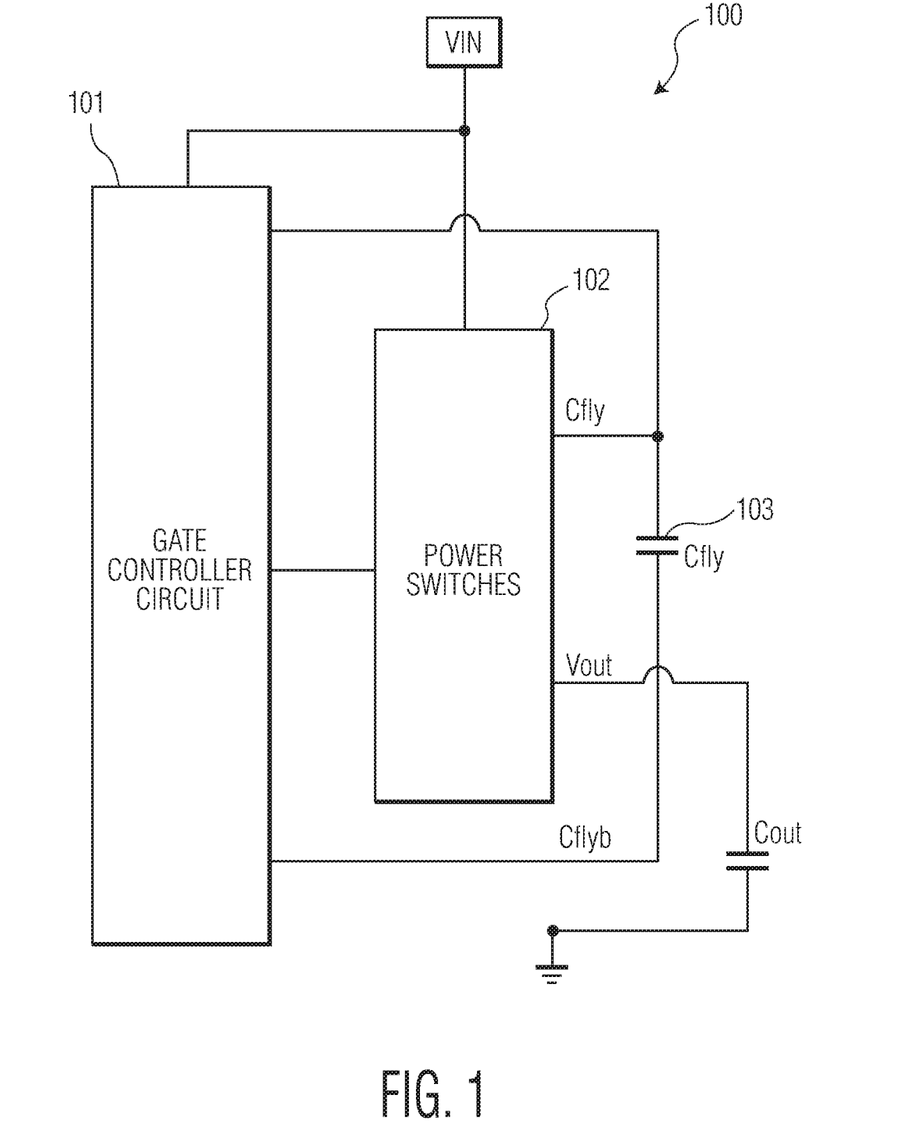
FIG. 1 is an example apparatus for controlling a switching order of power switches, in accordance with the present disclosure.

Turning now to the figures, FIG. 1 is an example apparatus for controlling a switching order of power switches, in accordance with the present disclosure. The apparatus 100 may include a power converter, such as a SCC, which converts an input voltage from a first voltage level to an output voltage of a second voltage level.

The power converter may include a plurality of power switches 102 and a flying capacitor 103. The power switches 102 may include parasitic bipolar transistors susceptible to the voltage overstress in response to excess stray inductance of the flying capacitor 103. The flying capacitor 103 coupled to the power switches 102 may also be susceptible to voltage overstress. As an example, the flying capacitor 103 may be susceptible to voltage overstress when the maximum voltage rating of the flying capacitor 103 is near an application voltage of the apparatus 100/the power converter. As an example of a range covering a situation which would be sufficiently close to cause the susceptibility of the flying capacitor, consider such overstress when the max voltage rating of Cfly capacitor is below the max application voltage of the power converter. As a more specific example, for either down-conversion converter from 20V to 10V, or up-converter from 10V to 20V, if a flying capacitor's max voltage rating is 16V (<20V), this concern would be present, though in both cases the average voltage across Cfly is 10V. With the voltage ringing caused by the stray inductor of Cfly and without the proper switching order, transient voltage of >20V could be applied on Cfly. The power switches 102 coupled to the flying capacitor 103 may convert the voltage using a switching order of power switches of the power converter to mitigate or prevent the voltage overstress of the flying capacitor 103 and/or the parasitic bipolar transistors of the plurality of power switches 102. For example, the power switches 102 are used to convert an input voltage of a first voltage level to an output voltage of a second voltage level. The input voltage may be from an internal power source (e.g., a battery) or an external power source (e.g., a wired or a wirelessly coupled power source), and which may dependent on the implementation being an up-conversion (e.g., voltage from internal power source may be up-converted) or a down-conversion (e.g., voltage from external power source may be down-converted).

Figure 2:
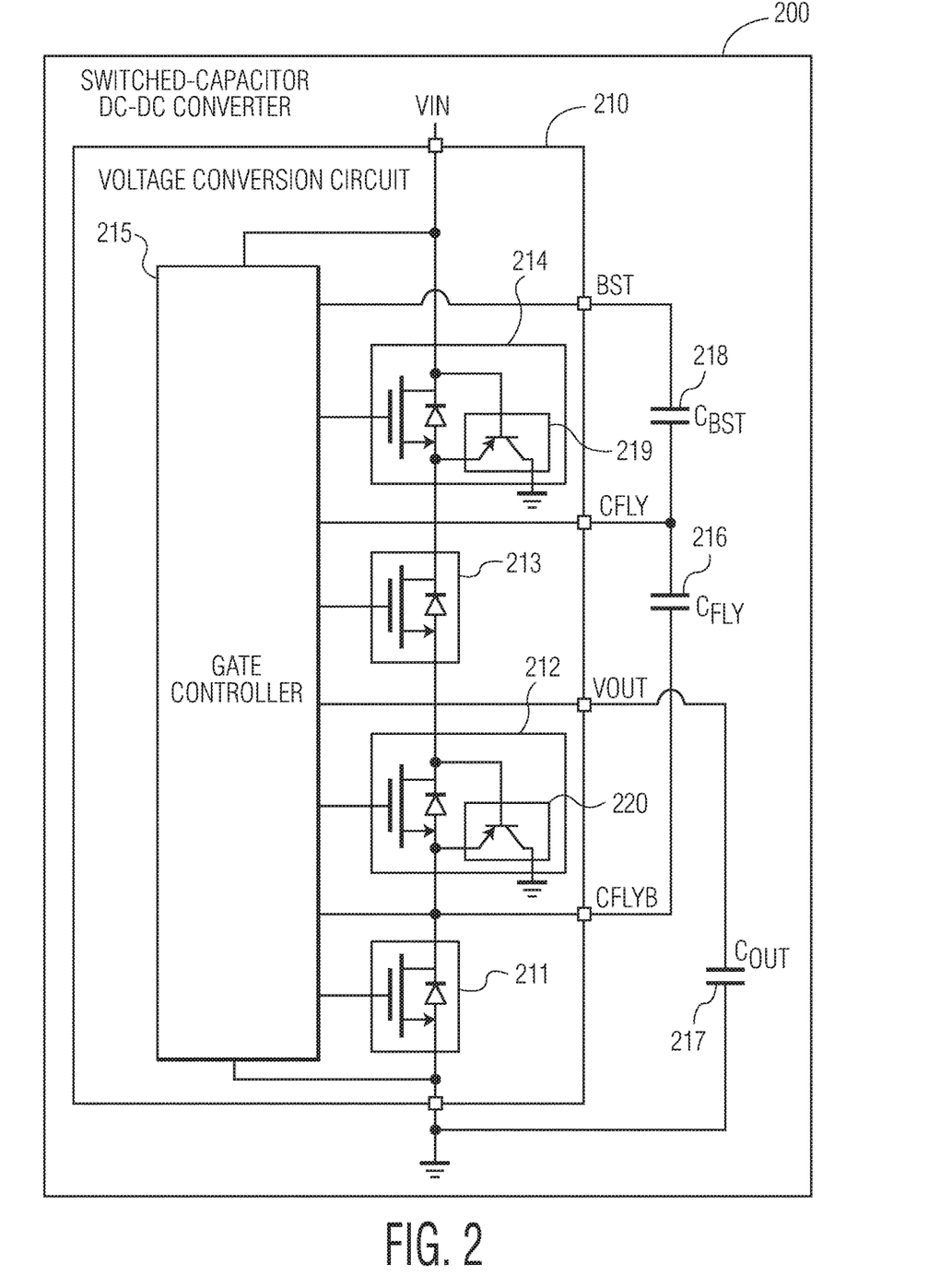
FIG. 2 is another example apparatus for controlling a switching order of power switches, in accordance with the present disclosure.

The apparatus 100 further includes a gate controller circuit 101. The gate controller circuit 101 controls the switching order of the power switches 102 to convert the input voltage to the second voltage level while mitigating the voltage overstress of the flying capacitor 103 and/or the parasitic bipolar transistors of the plurality of power switches 102. For example, the plurality of power switches 102 may include pairs of adjacent power switches, such as a first pair and a second pair of adjacent power switches as illustrated by FIG. 2. The gate controller circuit 101 controls the switching order by providing control signals to gates of the power switches 102 to selectively turn respective ones of the power switches 102 on and off during a switching cycle. Example switching cycles are further illustrated by FIG. 3A (e.g., a down-conversion) and FIGS. 4A-4B (e.g., up-conversion, as relating to FIG. 5 below in connection with the case of the SCC-circuit application).

An example switching cycle includes at least one blank time and at least one dead time, such as two blank times and two dead times per switching cycle. A blank time, as used herein, includes or refers to a time at which at least one power switch of the plurality of power switches 102 is in an one-state and the remaining of the plurality of power switches 102 are in an off-state. In specific embodiments, a blank time is associated with or includes one power switch of the plurality of power switches 102 being in the on-state and the remaining plurality of power switches 102 being in the off-state. For example, the gate controller circuit 101 may cause the blank time by delaying a transition from an on-state to an off-state of a first power switch of a pair of adjacent power switches from the transition of the second power switch of the pair of adjacent power switches to the off-state. A dead time includes or refers to a time at which each of the plurality of power switches 102 are in the off-state.

In various embodiments, a dead time may sequentially follow each blank time. For example, a switching cycle may include two dead times and two blank times (one of each for each pair of adjacent power switches), in which each blank time is followed by a dead time. The flying capacitor 103 may be associated with excessive stray inductance. The stray inductor may store energy when a pair of adjacent power switches are in an on-state and may drain the stored energy in response to a blank time (e.g., in response to one power switch of the pair of adjacent power switches transitioning to an off-state while the other power switch of the pair remains in the on-state).

Accordingly, the gate control circuit 101 controls the switching order by transitioning a first power switch and a second power switch of adjacent pairs of the plurality of power switches 102 from the on-state to the off-state at different times. The gate control circuit 101 may delay the transition to the off-state of the second power switch from the transition of the first power switch to the off-state and, in response, caused energy stored via the excessive stray inductance to drain. By draining the energy stored, overvoltage stress on the parasitic bipolar transistors of the power switches 102 and/or on the flying capacitor 103 may be mitigated.

The above-described power converter may be used to convert the input voltage from the first voltage level to the second voltage level which is greater than the first voltage level, herein generally referred to as "up-conversion". In other embodiments and/or in addition, the power converter may convert the input voltage from the first voltage level to the second voltage level which is less than the first voltage level, herein generally referred to as "down-conversion". For example, the flying capacitor 103, the plurality of power switches 102 and the gate controller circuit 101 form pan of a SCC. The SCC may convert the input voltage from a first power source to the second voltage level via one or more of an up-conversion mode and a down-conversion mode, and provides the output voltage at the second voltage level to a load circuit.

FIG. 2 is another example apparatus for controlling a switching order of power switches, in accordance with the present disclosure. The apparatus includes a power converter 200, such as a SCC, which includes a voltage conversion circuit 210 and a flying capacitor 216. The voltage conversion circuit 210 further includes a gate controller circuit 215 used to control a switching order of the power switches 211, 212, 213, 214 of the SCC in a controlled manner that mitigates overvoltage stress on parasitic bipolar transistors (e.g., 219, 220) of the power switches 211, 212, 213, 214 and/or on the flying capacitor 216.

Each of the power switches 211, 212, 213, 214 has a parasitic bipolar transistor, as illustrated by parasitic bipolar transistors 219 and 220 of power switches 212, 214. The parasitic bipolar transistors may include parasitic PNP or NPN parasitic bipolar transistors. Depending on the connection of the NWELL or deep NWELL (DNW) or N-type burier layer (NBL), the parasitic bipolar transistors 219, 220 in respective power switches 212, 214 are susceptible to be turned on in the event excessive stray inductance of the flying capacitor 216 is present. The unintentionally turn on of the parasitic bipolar transistors 219, 220 may dissipate high transient power and generate excess heat source that may degrade the respective power switches 212, 214 and/or other surrounding circuits integrated together in the voltage conversion circuit 210. Additionally, the voltage rating of the flying capacitor 216 is limited by the respective size of the flying capacitor 216. The flying capacitor 216 is also susceptible to overvoltage stress when a maximum voltage of the flying capacitor 216 is within a threshold (e.g., is near) the application voltage of the power converter 200.

In a specific example, the SCC includes two pairs of adjacent power switches, the first pair 212, 214 and the second pair 211, 213. The gate control circuit 215 controls the switching order of the first pair 212, 214 and the second pair 211, 213 to convert an input voltage from a first voltage level to a second voltage level while mitigating overvoltage stress on the parasitic bipolar transistors 219, 220 and/or the flying capacitor 216.

The power converter 200 may optionally include additional circuit components. For example, the power converter 200 may additionally include a bootstrap capacitor 218 and/or an output-voltage capacitor 217. Furthermore, the power converter may include additional numbers of circuit components, such as more than two pairs or four power switches, more than one flying capacitor 216, and/or more than one bootstrap capacitor 218 than illustrated by FIG. 2.

Figure 3A:
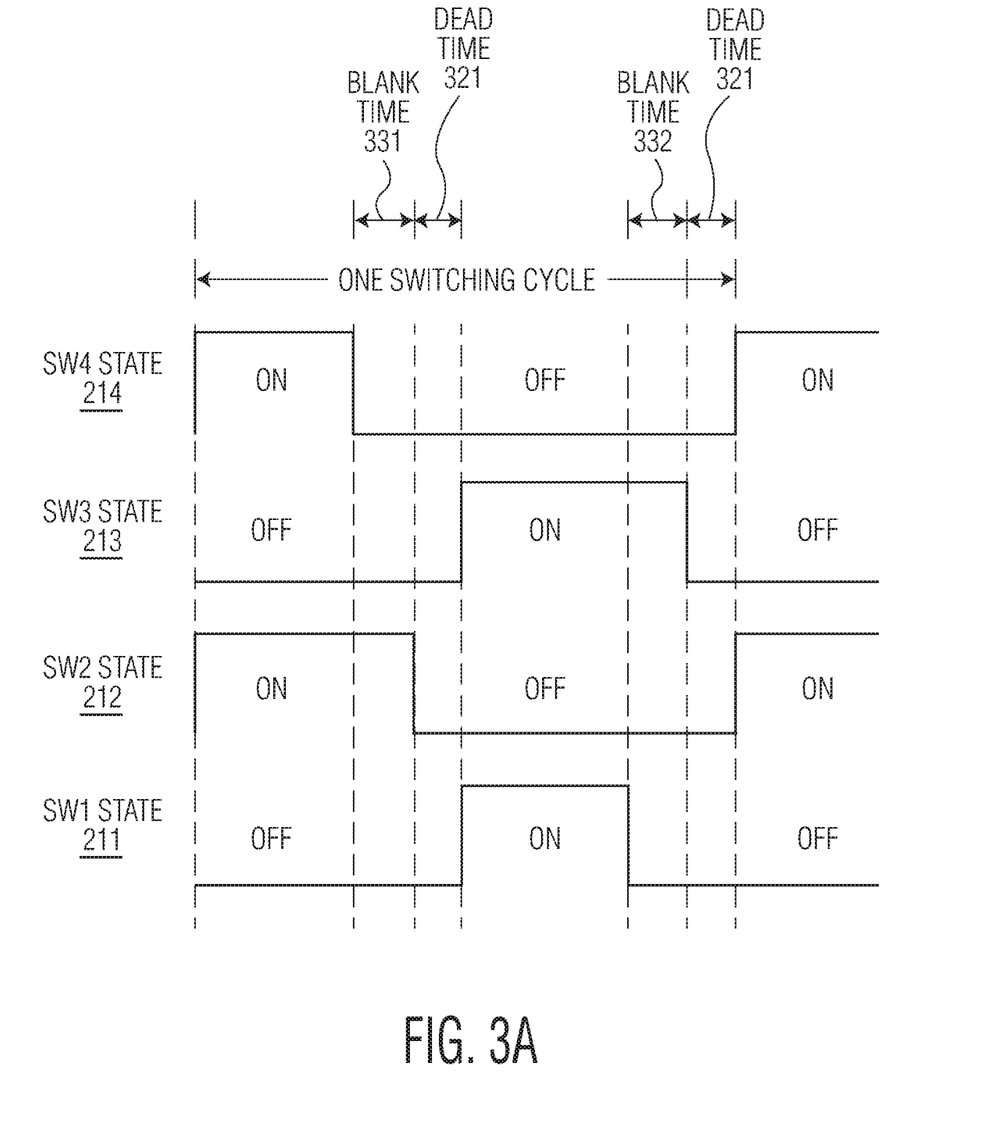
FIGS. 3A-3C illustrate examples switching order of a plurality of power switches of an apparatus of the type implemented in a manner consisted with FIG. 2 for down-conversion of an input voltage and resulting mitigation of voltage overstress, in accordance with the present disclosure.
Figure 3B:
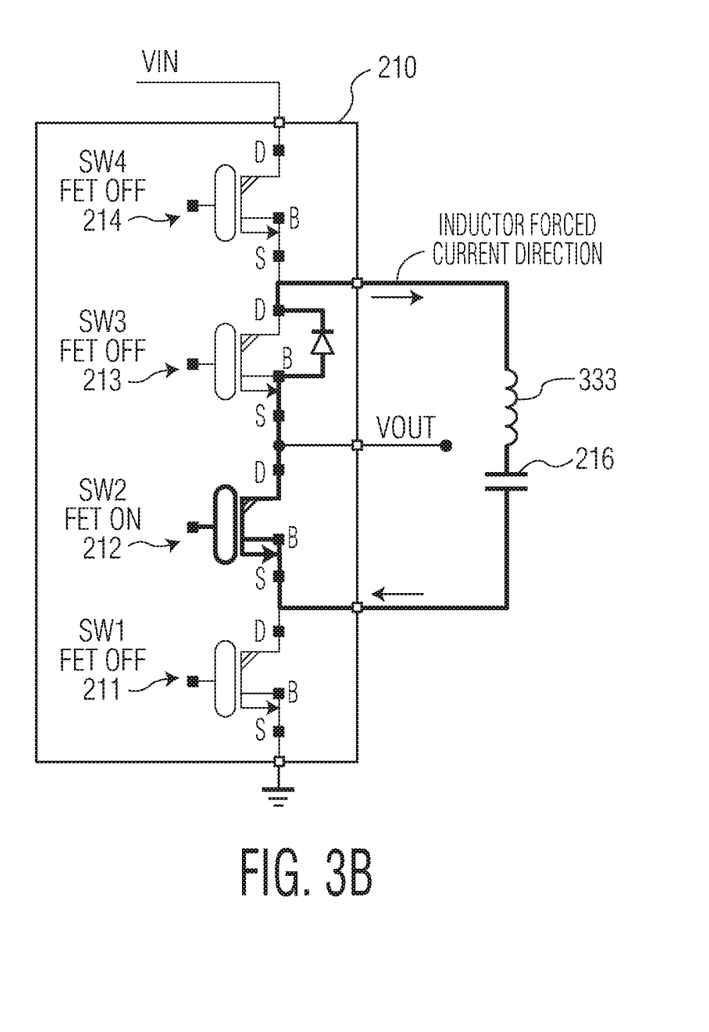
Figure 3C:
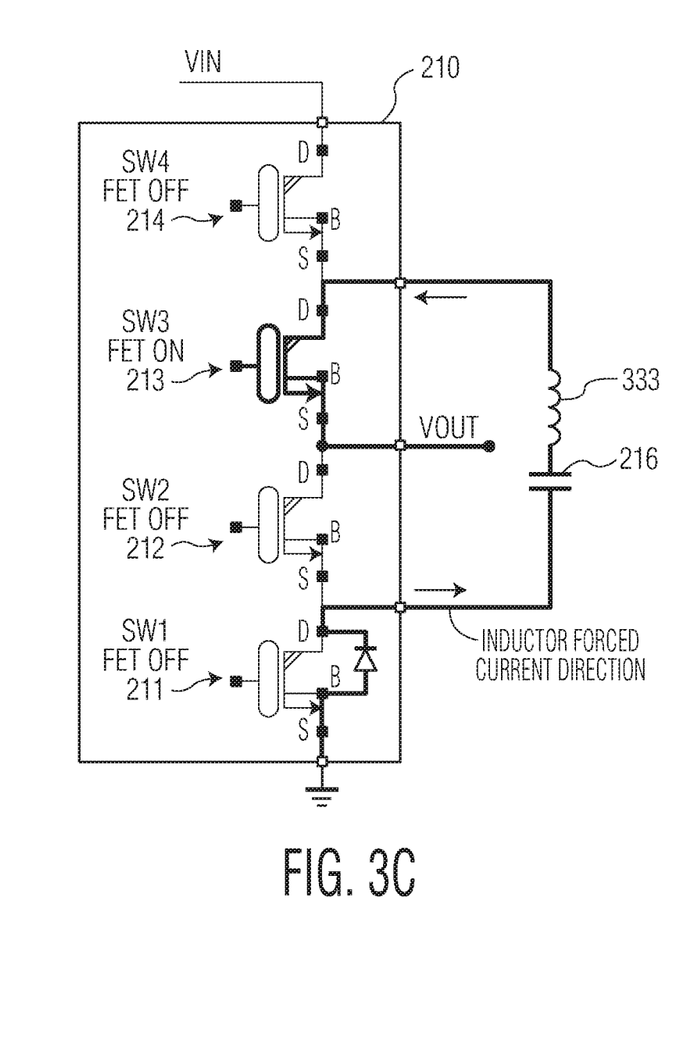

FIGS. 3A-3C illustrate an example switching order of a plurality of power switches of an apparatus of the type implemented in a manner consisted with FIG. 2 for down-conversion of an input voltage and resulting mitigation of voltage overstress, in accordance with the present disclosure.

More specifically, FIG. 3A shows an example timing diagram for a switching cycle for the plurality of power switches 211, 212, 213, 214 of FIG. 2 for a down-conversion mode (e.g., reducing the input voltage level). As shown by FIG. 3A, pairs of adjacent power switches are simultaneously switched to an on-state, and switched to an off-state at delayed times. More specifically, power switches 212, 214 are switched on while power switches 211, 213 are switched off. Rather than simultaneously switching respective pairs of switches off (e.g., switch both power switches 212, 214 or power switches 211, 213), one of the power switches of the pair (e.g., power switch 212 and 213) have a delayed transition to the off-state compared to the other of the pair of adjacent power switches. When all switches are off, the power converter may be said to be in a dead time 321 (e.g., each two adjacently connected power switches are in an off-state). By delaying one of the power switches of the pair from transitioning, a blank time 331, 332 occurs in which one power switch of a pair is in the on-state and the remaining plurality of power switches are in the off-state. The blank times 331, 332 may avoid high current enforced by the stray inductor (e.g., stray inductor 333 illustrated by FIGS. 3B-3C) of the flying capacitor 216 into the parasitic bipolar transistors (e.g., transistors 219, 220 of FIG. 2) in either power switch 212, 214 during the dead time(s) 321, while also minimalizing a peak voltage ringing across the flying capacitor 216 caused by the stray inductor during the dead time(s) 321. As further illustrated herein, during the blank time(s) 331, 332, energy stored on the stray inductor may be drained. Without the use of the blank time(s) 331, 332, if there is current being forced by the stray inductor into the power switches 212, 214, the parasitic bipolar transistor (s) 219, 220 may turn on.

The switching order may be different for down-conversion as compared to up-conversion. In a specific example, a down-conversion may convert 2:1. The switching order illustrated by FIG. 3A shows that the on-state duration of a first power switch 214 is purposely reduced by a certain amount of time as compared to a second power switch 212, which is a (first) blank time 331. The first and second power switches 212, 214 form a first pair of adjacent power switches. Within this blank time 331, energy stored in the stray inductor dries out and hence when the second power switch 212 transits to the off-state, there is no (or minimal) current being forced into the parasitic bipolar transistor 220 of the second power switch 212. A (second) blank time 332 is applied to on-state duration of power switch 211, which makes sure there is no (or minimal) energy left in the stray inductor and hence no (or minimal) current is forced into the parasitic bipolar transistor 219 inside the first power switch 214 during the dead time 321 when the fourth power switch 213 transits into off-state and the first power switch 214 is not turned on yet.

FIGS. 3B and 3C illustrate example stray inductor current paths when the power converter 200 is down converting. FIG. 3B illustrates the inductor current path during the blank time 331 associated with the first power switch 214 in which the second power switch 212 remains in the on-state during the respective blank time 331, with the first and second power switches 212, 214 forming the first pair of adjacent power switches. FIG. 3C illustrates the inductor current path during the blank time 332 associated with the third power switch 211 in which the fourth power switch 213 remains in the on-state during the respective blank time 332, with the third and fourth power switches 211, 213 forming a second pair of adjacent power switches. Furthermore, the blank times 332 can also avoid excessively high voltage stress due to inductive voltage ringing caused by the stray inductor 333 being applied to the flying capacitor(s) 216.

FIGS. 4A-4D illustrate examples switching order of a plurality of power switches of an apparatus of the type implemented in a manner consisted with FIG. 2 for up-conversion of an input voltage and resulting mitigation of voltage overstress, in accordance with the present disclosure.

Figure 4A:
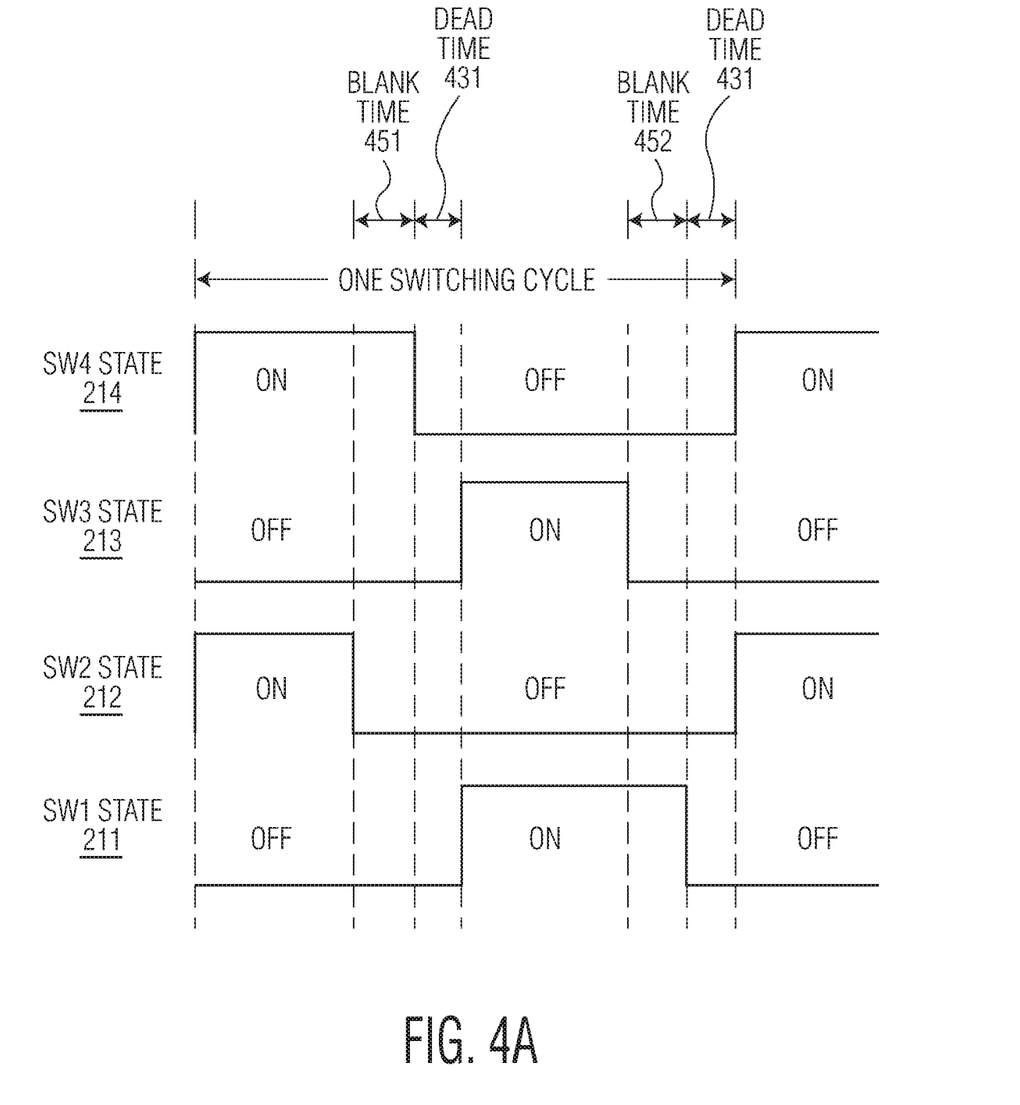
FIGS. 4A-4D illustrate examples switching order of a plurality of power switches of an apparatus of the type implemented in a manner consisted with FIG. 2 for up-conversion of an input voltage and resulting mitigation of voltage overstress, in accordance with the present disclosure.
Figure 4B:
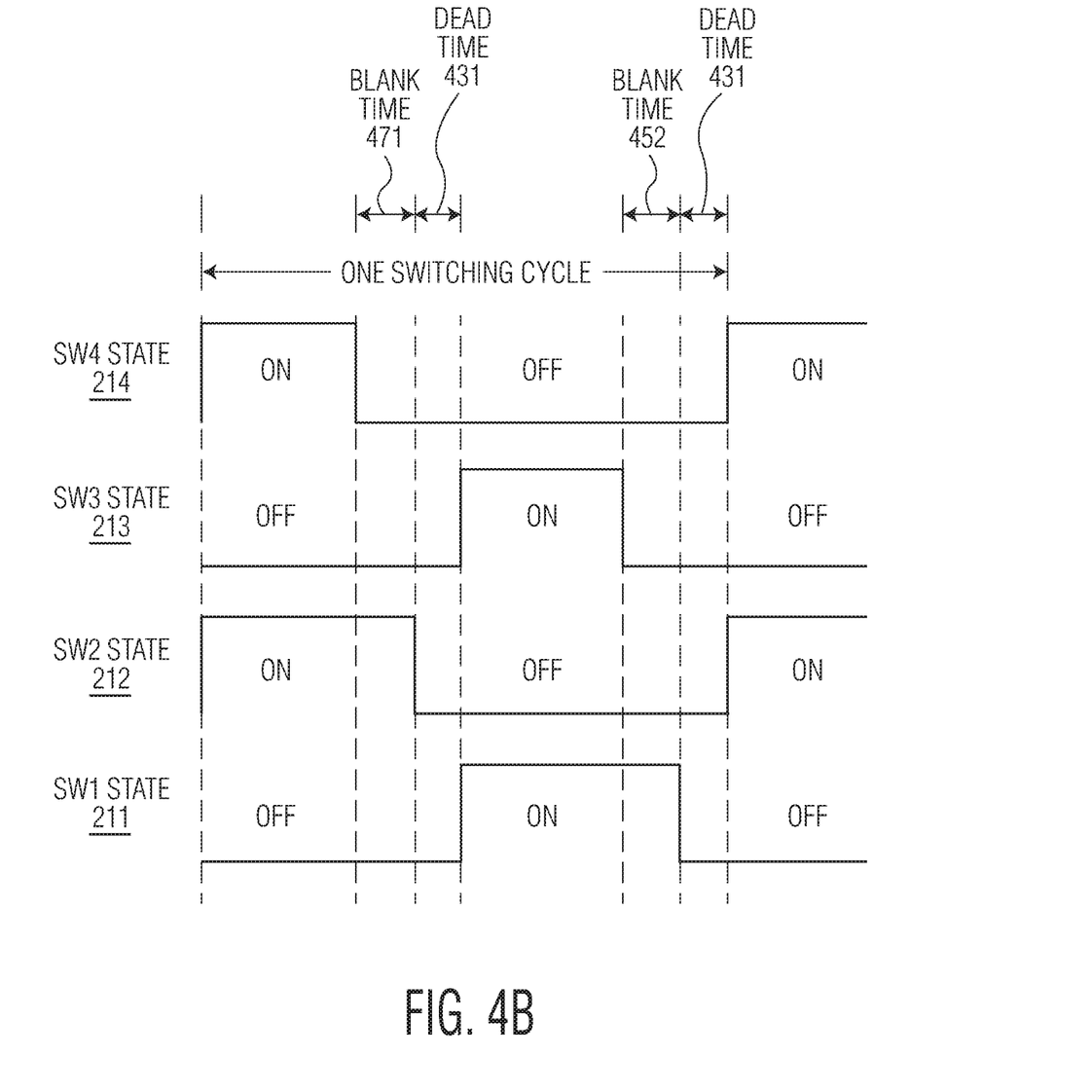

More specifically, FIGS. 4A-4B shows an example timing diagram for a switching cycle for the plurality of power switches of FIG. 2 for an up-conversion mode (e.g., increasing the input voltage level). As shown by FIGS. 4A-4B, pairs of adjacent power switches are simultaneously switched to an on-state, and switched to an off-state at delayed times. In a specific example, an up-conversion may convert 1:2.

FIG. 4A illustrates an example switching order in an embodiment in which the application voltage across the flying capacitor(s) 216 is below the maximum voltage tolerance of the flying capacitor 216 well enough (e.g., in 1:2 up-conversion, the application voltage across Cfly is lower than 50% of maximum voltage tolerance of Cfly). The blank time 451 is applied to on-state duration of the second power switch 212 to avoid forced stray inductor current flowing into the parasitic bipolar transistor 219 in the first power switch 214. A blank time 452 is also applied to on-state duration of the fourth power switch 213 to avoid forced stray inductor current flowing into the parasitic bipolar transistor 220 in the second power switch 212. Each blank time 451, 452 is followed by a respective dead time 431.

FIG. 4B illustrates an example switching order in an embodiment in which the application voltage across the flying capacitor(s) 216 is within a threshold (e.g., 50% in 1:2 up-conversion case) of the maximum voltage tolerance of the flying capacitor 216. As compared to FIG. 4A, a blank time 471 is applied to the on-state duration of the first power switch 214, instead of the second power switch 212. In such embodiments, the stray inductor current is forced into the parasitic bipolar transistor 219 in the first power switch 214, which, compared with risking the flying capacitor 216 being overstressed by voltage ringing due to the stray inductor 333, can be less critical to the reliability and lifetime of the power converter 200. Furthermore, programmability to choose the timing scheme in FIG. 4A or FIG. 4B can be offered to a charging system that includes the power converter 200 using integrated on-chip registers in the power converter 200. Each blank time 471, 452 is followed by a respective dead time 431.

Figure 4C:
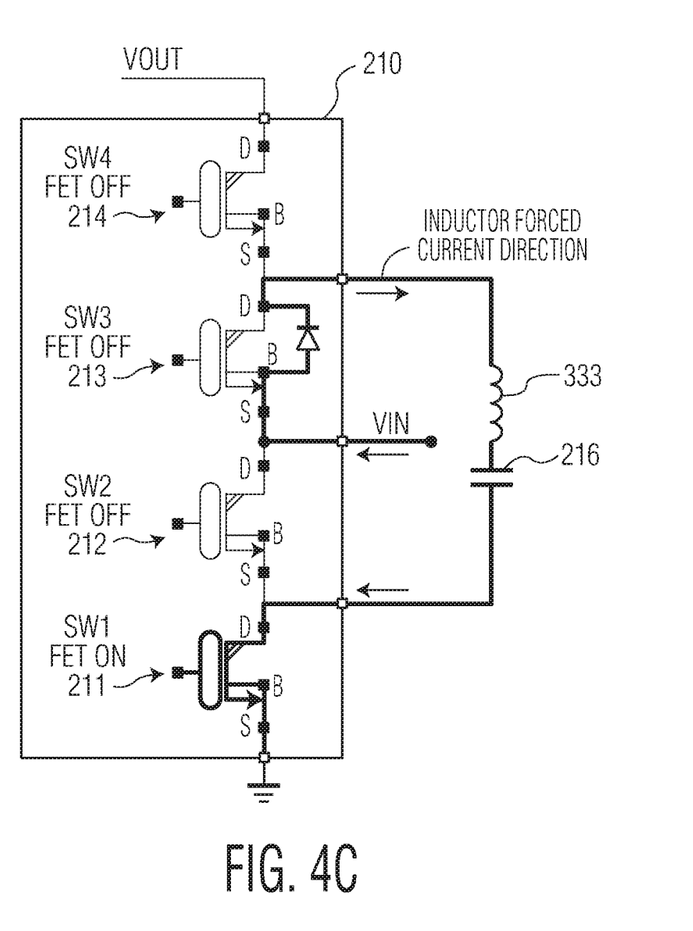
Figure 4D:
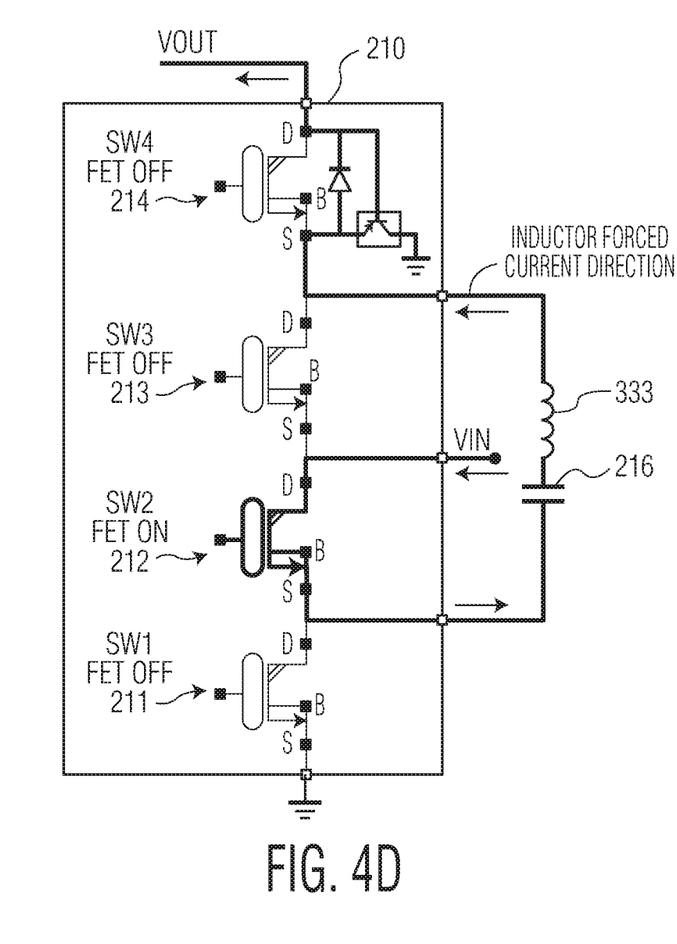

FIGS. 4C-4D illustrate the example stray inductor current paths when the power converter 200 is up converting. FIG. 4C illustrates the inductor current path during the blank time 452 associated with the fourth power switch 213 in which the third power switch 211 remains on (with the third and fourth power switches 211, 213 forming the second pair of adjacent power switches). FIG. 4D illustrates the inductor current path during the blank time 471 associated with the first power switch 214, in which the second power switch 212 remains on (with the first and second power switches 212, 214 forming the first pair of adjacent power switches).

Figure 5:
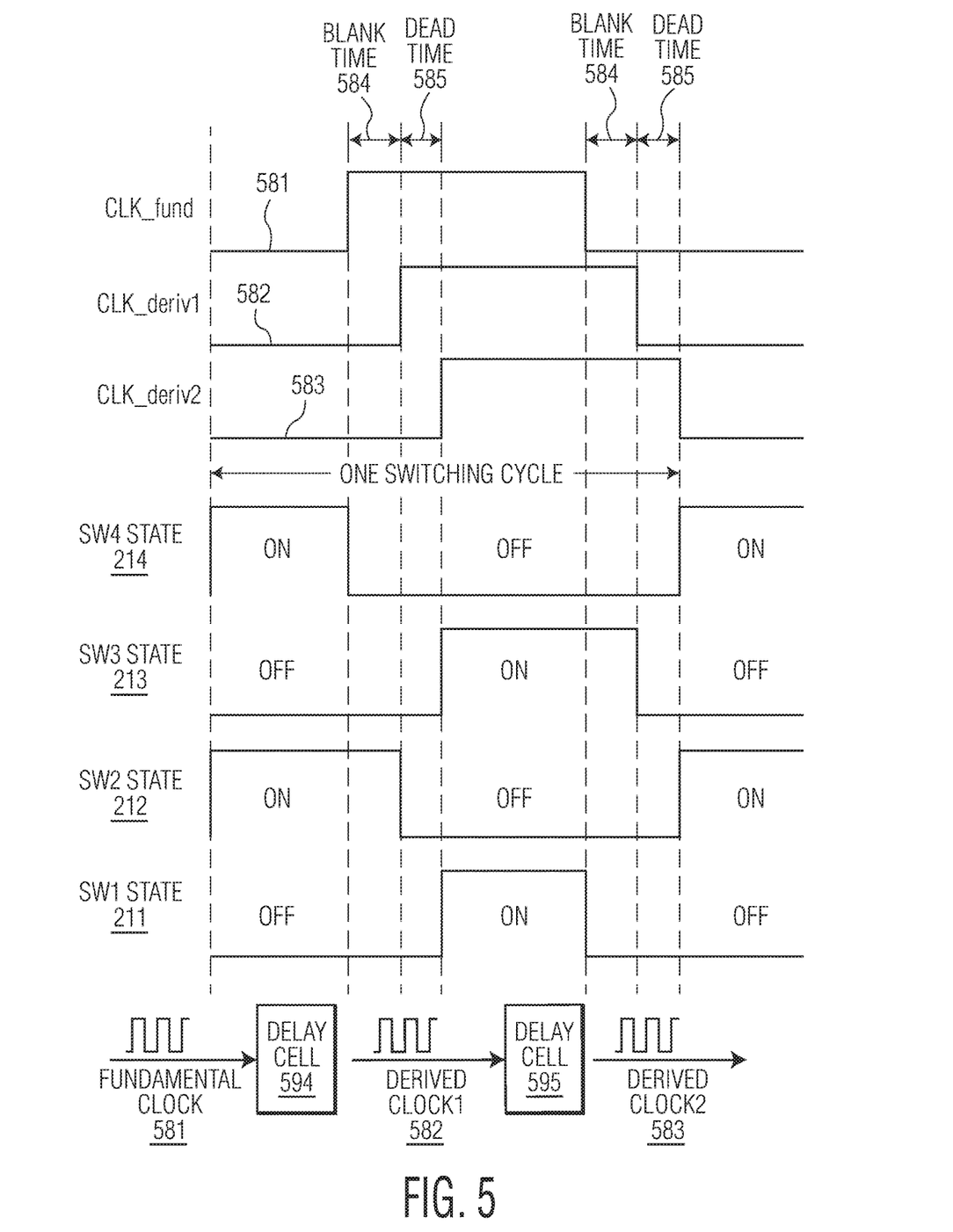
FIG. 5 illustrates an example switching tuning, in accordance with the present disclosure.

FIG. 5 illustrates an example switching timing, in accordance with the present disclosure. The switching timing may be used by a gate control circuit of a power converter, in various embodiments.

The gate control circuit may include one or more delay cells 594, 595. For a fifty percent duty-cycle fundamental clock signal 581, two additional clock signals 582, 583 may be derived through the delay cells 594, 595. The first delay cell 594 may have a time delay equal to the amount of blank time 584 and the second delay cell 595 may have a time delay equal to the amount of dead time 585. Delay programmability may be implemented and given to system developers for accommodation of a wide variation of optimal blank time in different system environments. The delay cells 594, 595 can be implemented with a rising edge delay the same as a falling edge delay, or may be implemented with a rising delay different from a falling delay. The latter provides more flexibility to fine tune the timing but with more complexity and design effort.

A variety of latch-based control logic can be adopted in association with the three clock signals 581, 582, 583 to generate the on-off control signals that turn on or off the power switches according to the timing diagram illustrated in FIGS. 3A and 4A-4B. An up-/down-conversion mode indicator may be used to select which timing diagram to operate by.

Figure 6:
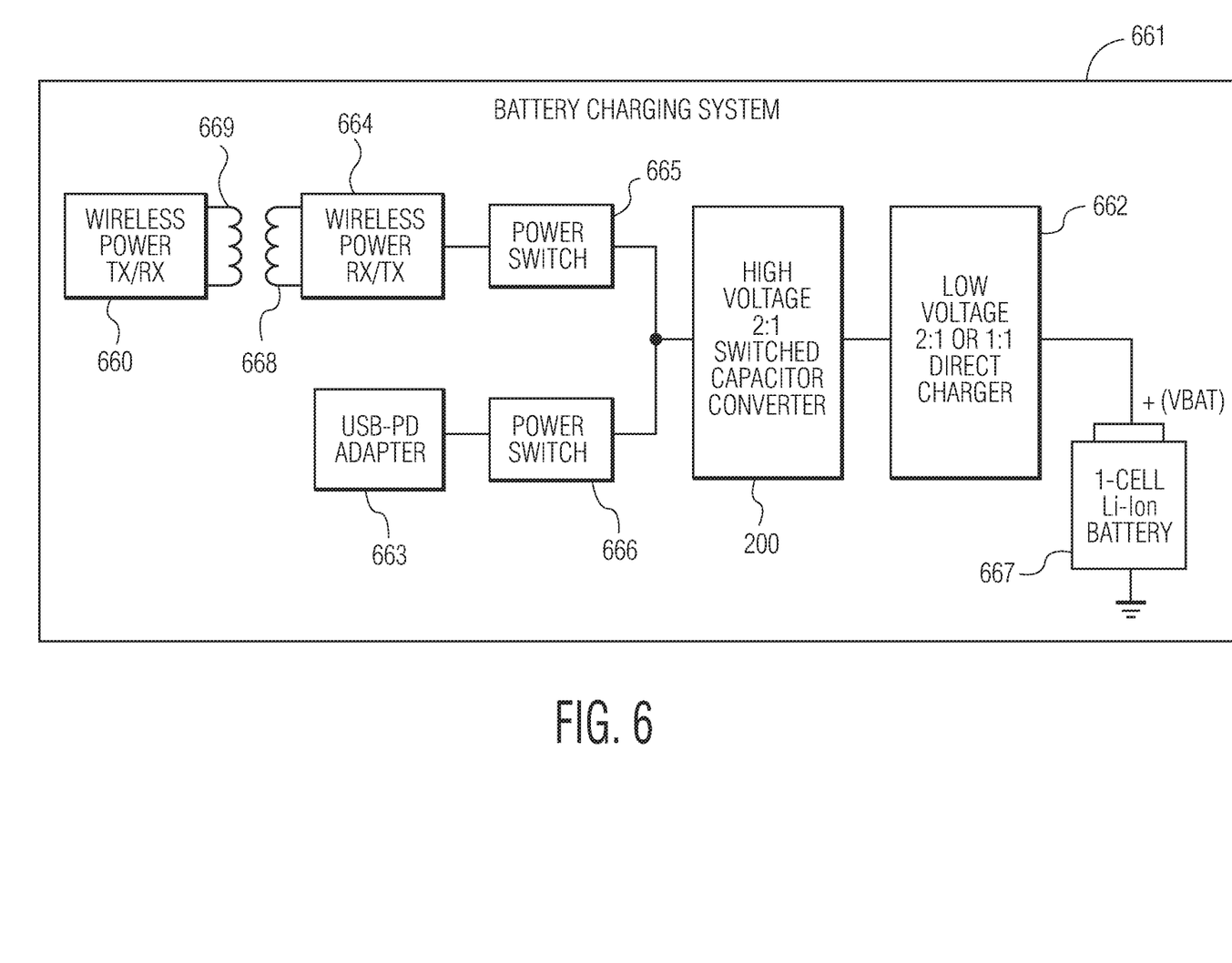
FIG. 6 illustrates a specific example apparatus including a power converter, in accordance with the present disclosure.

FIG. 6 illustrates a specific example apparatus including a power converter, in accordance with the present disclosure. The apparatus may include a charging system 661 having one or more power converters, such as one or more of the power converter 200 previously described in connection with FIG. 2.

In many high-efficiency high-voltage battery charging application for mobile devices, as illustrated in FIG. 6, the power converters 200, 662 are employed to convert DC voltage from the power sources, such as a Universal Serial Bus (USB)-Power Delivery (PD) adapter 663 or a wireless power receiver (RX) or transceiver (TRX) 664, to battery voltage, delivering power into the battery 667. For example, 16.8V output voltage from a wireless power RX 664 can be down-converted by a ratio of 2:1 in power converter 200, and further down-converted by another ratio of 2:1 in the other power converter 662, resulting in a 4.2V power source connected to the battery 667. In various embodiments, the charging system 661 may include more than one power source, such as those associated with the USB-PD 663 and the wireless power RX/TX 664 and which may be switched between using power switches 665, 666.

Reversely, the power converters 200, 662 illustrated by FIG. 6 can also operate in an up-conversion mode. For example, the battery voltage from the battery 667 can be up-converted by the other power converter 662 and the power converter 200, respectively by a ratio of two, resulting in a four-time-higher DC voltage present at the input terminal of a wireless transceiver 664 which transmits power to the receiving device 660 through inductively coupled coils 668 and 669.

In specific embodiments, the power converters 200 and 662 may be of the same converter circuit topology with different transistor implementation for different operating voltage tolerance. Without loss of generality, power converter 200 is described as a SCC, however, examples are not so limited, and the other power converter 662 may be implemented in a manner that is consistent with power converter 200.

Monolithic switched-capacitor DC-DC converters, such as ones used in high-voltage high-efficiency battery charging systems for mobile devices, are subject to two types of electrical overstress caused by excessive stray inductor in or associated with the flying capacitor(s). The types of electrical overstress include the voltage overshoot that can forcefully turn on parasitic bipolar transistor inherent in power switches manufactured in Complementary Metal-Oxide-Semiconductor (CMOS) and Bipolar-CMOS-DMOS (Double Diffused Metal Oxide Semiconductor) (BCD) processes and the voltage ringing across the flying capacitor(s) that can have its peak over the maximum voltage tolerance of the capacitor. The overstress is periodically imposed when the power converter is switching and is detrimental to the lifetime or reliability of the charging system 661. In accordance with various embodiments, the example switching order may be used to mitigate and/or prevent both stresses for the SCC operating in the down-conversion mode and at least one of the stresses in up-conversion mode, boosting robustness of the charging system 661.

In a specific example, a switching cycle in the power converter 200 and/or other power converter 662 used to mitigate the above-described overvoltage stress may include the first pair of adjacent power switches transitioning to an on-state while the second pair of adjacent power switches are in an off-state at a first time, a first power switch of the first pair transitioning to the off-state at a second time, such that the second power switch of first pair is in the on-state and the second pair are in the off-state, and a second power switch of the first pair transitioning to the off-state at a third time, such that the plurality of power switches are in the off-state. The switching cycle may further include the second pair of adjacent power switches transitioning to the on-state while the first pair of adjacent power switches are in the off-state at a fourth time, a first power switch of the second pair transitioning to the off-state at a fifth time, such that the second power switch of second pair is in the on-state and the first pair are in the off-state, and a second power switch of the second pair transitioning to the off-state at a sixth time, such that the plurality of power switches are in the off-state.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, and/or other circuit-type depictions (e.g., reference numerals 101 and 215 and FIGS. 1-2 depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches described herein. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described herein is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, the apparatus illustrated by FIG. 1 may be used to implement various methodologies described herein. As another example, the power converter 200 illustrated by FIG. 2 may be implemented in the battery system illustrated by FIG. 6. Such modifications do not depart from the true spirit and scope of various aspects of the disclosure, including aspects set forth in the claims.

What is claimed is:

1. A method comprising:
controlling a switching order of a plurality of power switches, the power switches being coupled to a flying capacitor and the power switches including parasitic bipolar transistors susceptible to a voltage overstress in response to excess stray inductance of the flying capacitor; and
in response to the controlled switching order, converting an input voltage of a first voltage level to an output voltage of a second voltage level while mitigating the voltage overstress of the parasitic bipolar transistors of the plurality of power switches.

2. The method of claim 1, wherein the flying capacitor is further susceptible to voltage overstress, and controlling the switching order of the plurality of power switches includes transitioning a first power switch and a second power switch of adjacent pairs of the plurality of power switches between an on-state and an off-state at different times while mitigating the voltage overstress of the flying capacitor and the parasitic bipolar transistors of the plurality of power switches.

3. The method of claim 1, wherein the plurality of power switches include two pairs of adjacent power switches, and controlling the switching order includes, for each pair of adjacent power switches:
transitioning a first power switch of the respective pair of adjacent power switches from an on-state to an off-state at a first time; and
transitioning a second power switch of the respective pair of adjacent power switches from the on-state to the off-state at a second time which is delayed from the first time.

4. The method of claim 3, wherein transitioning the second power switch of the respective pair of adjacent power switches at the second time mitigates or prevents at least one parasitic bipolar transistor of the respective pair from transitioning back to the on-state in response to the excess stray inductance of the flying capacitor.

5. The method of claim 3, wherein transitioning the second power switch of the respective pair of adjacent power switches at the second time minimizes a peak voltage ringing across the flying capacitor caused by the excess stray inductance when the plurality of power switches are in the off-state.

6. The method of claim 1, wherein the plurality of power switches include a first pair and a second pair of adjacent power switches and controlling the switching order of the plurality of power switches further includes:
transitioning the first pair of adjacent power switches to an on-state while the second pair of adjacent power switches are in an off-state;
transitioning a first power switch of the first pair to the off-state at a first time such that a second power switch of the first pair remains in the on-state while the first power switch of the first pair and the second pair of adjacent power switches are in the off-state; and
transitioning the second power switch of the first pair to the off-state at a second time that is delayed from the first time such that each of the plurality of power switches are in the off-state.

7. The method of claim 6, wherein the plurality of power switches form part of a switched-capacitor DC-DC converter (SCC), and the first time is associated with a blank time of the SCC and the second time is associated with a dead time of the SCC.

8. The method of claim 6, wherein controlling the switching order further includes:
transitioning the second pair of adjacent power switches to the on-state while the first pair of adjacent power switches remain in the off-state;
transitioning a first power switch of the second pair to the off-state at a third time such that the second power switch of the second pair remains in the on-state while the first power switch of the second pair and the first pair of adjacent power switches are in the off-state; and
transitioning the second power switch of the second pair to the off-state at a fourth time that is delayed from the third time such that each of the plurality of power switches are in the off-state.

9. The method of claim 8, wherein the first time and the third time are associated with a blank time and the second time and the fourth time are associated with a dead time.

10. The method of claim 1, wherein the flying capacitor is associated with the excessive stray inductance, and the plurality of power switches include pairs of adjacent power switches, and the method further includes, via the excessive stray inductance of the flying capacitor:
storing energy when a first pair of adjacent power switches of the plurality of power switches are in an on-state; and
draining the stored energy in response to one power switch of the first pair transitioning to an off-state while the other power switch of the first pair remains in the on-state.

11. The method of claim 1, wherein the flying capacitor is further susceptible to voltage overstress when a maximum voltage rating of the flying capacitor is near an application voltage and controlling the switching order of the plurality of power switches includes mitigating the voltage overstress of the flying capacitor and the parasitic bipolar transistors of the plurality of power switches.

12. An apparatus comprising:
a flying capacitor susceptible to voltage over stress;
a plurality of power switches coupled to the flying capacitor and to convert an input voltage of a first voltage level to an output voltage of a second voltage level, the plurality of power switches having parasitic bipolar transistors susceptible to voltage overstress in response to excess stray inductance of the flying capacitor; and
a gate controller circuit to control a switching order of the plurality of power switches to convert the input voltage to the second voltage level while mitigating the voltage overstress of the flying capacitor and the parasitic bipolar transistors of the plurality of power switches.

13. The apparatus of claim 12, wherein the flying capacitor, the plurality of power switches and the gate controller circuit form part of a switched-capacitor DC-DC converter.

14. The apparatus of claim 12, wherein the plurality of power switches include a first pair and a second pair of adjacent power switches, and the gate controller circuit is to control the switching order by providing control signals to gates of the plurality of power switches to selectively turn the plurality of power switches on and off during a switching cycle, the switching cycle including:
at least one blank time in which at least one power switch of the plurality of power switches is in an on-state and the remaining of the plurality of power switches are in an off-state; and
at least one dead time in which the plurality of power switches are in the off-state, wherein the at least one dead time sequentially follows the at least one blank time.

15. The apparatus of claim 14, wherein the at least one blank time is associated with one power switch of the plurality of power switches being in the on-state and the remaining plurality of power switches being in the off-state.

16. The apparatus of claim 12, wherein the excess stray inductance is associated with the flying capacitor and is to store energy when a pair of adjacent power switches are in an on-state and to drain the stored energy in response to one power switch of the pair of adjacent power switches transitioning to an off-state while the other power switch of the pair of adjacent power switches remains in the on-state.

17. The apparatus of claim 12, wherein the apparatus comprises a battery charging system including a switched-capacitor DC-DC converter, and wherein the flying capacitor, the plurality of power switches and the gate controller circuit form part of the switched-capacitor DC-DC converter.

18. The apparatus of claim 12, wherein the flying capacitor, the plurality of power switches and the gate controller circuit form part of a switched-capacitor DC-DC converter, and the switched-capacitor DC-DC converter is to convert the input voltage from a first power source to the second voltage level via one or more of an up-conversion mode and a down-conversion mode, and to provide the output voltage at the second voltage level to a load circuit.

19. The apparatus of claim 12, wherein the gate control circuit is to control the switching order includes transitioning a first power switch and a second power switch of pairs of adjacent power switches of the plurality of power switches from on-state to an off-state at different times.

20. The apparatus of claim 19, wherein the flying capacitor is associated with the excessive stray inductance, and the gate control circuit is to delay the transition to the off-state of the second power switch from the transition of the first power switch of each respective pair of adjacent power switches to the off-state and, in response, to drain energy stored via the excessive stray inductance of the flying capacitor.

* * * * *